Feb. 7, 1933.  A. B. SHANTZ  1,896,103
HYDRAULIC BRAKE
Filed Aug. 28, 1930   3 Sheets-Sheet 1
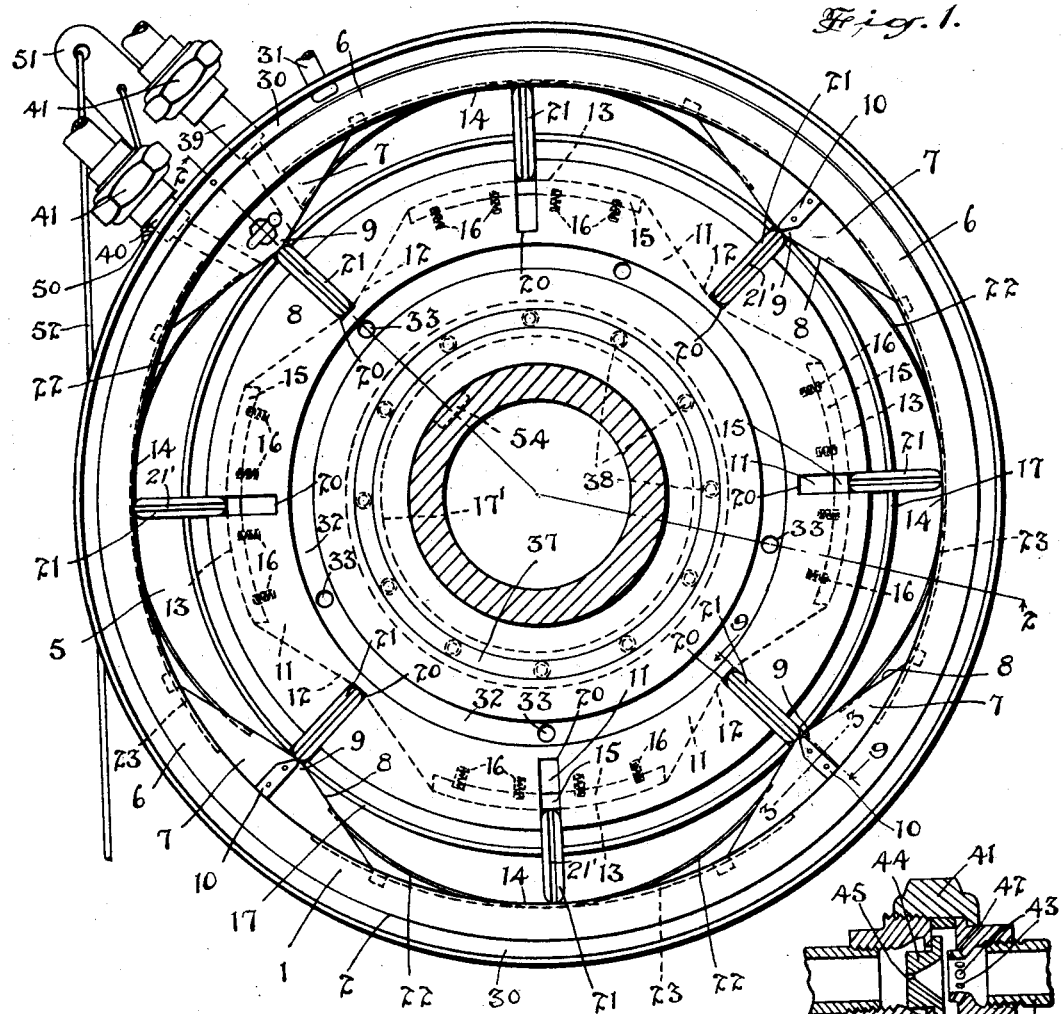
Fig. 1.
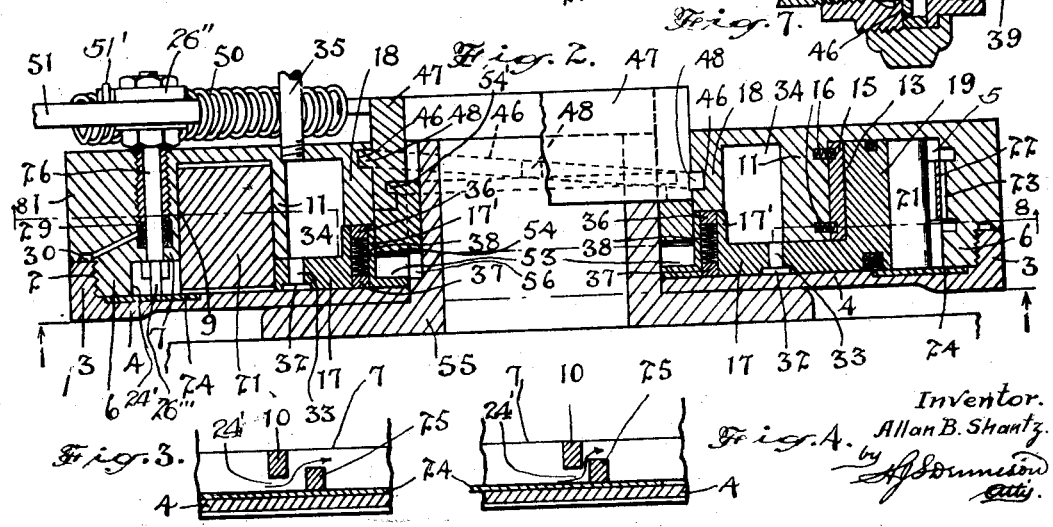
Fig. 2.  Fig. 7.
Fig. 3.  Fig. 4.
Inventor.
Allan B. Shantz Feb. 7, 1933. A. B. SHANTZ 1,896,103
HYDRAULIC BRAKE
Filed Aug. 28, 1930 3 Sheets-Sheet 2

Inventor.
Allan B. Shantz.

Feb. 7, 1933.  A. B. SHANTZ  1,896,103
HYDRAULIC BRAKE
Filed Aug. 28, 1930   3 Sheets-Sheet 3

Inventor:
Allan B. Shantz.
by
atty.

Patented Feb. 7, 1933

1,896,103

UNITED STATES PATENT OFFICE

ALLAN B. SHANTZ, OF TORONTO, ONTARIO, CANADA

HYDRAULIC BRAKE

Application filed August 28, 1930. Serial No. 478,362.

The principal object of the invention is to provide a brake for retarding and arresting the movement of a rotating member with the utmost ease and without necessitating the use of much force on the part of the operator.

Further objects of the invention are to provide a structure which will operate with uniform effectiveness unaffected by weather or temperature conditions and which will not be subject to excessive wear under severe application and will maintain accurate adjustment for long periods.

A still further object is to enable a positive braking effect being maintained for long periods without heating or seizing, permitting its use in motor car or similar service on long grades without deterioration.

The principal feature of the invention consists in the novel construction and arrangement of parts whereby a plurality of radially operated vanes carried by a rotor member are projected into recesses in a fixed housing in which a non-compressible fluid is retained and the flow of said fluid is regulated to produce a braking effect on said vanes and rotor.

In the accompanying drawings, Figure 1 is a plan view of the brake mechanism with the cover plate and valving ring removed.

Figure 2 is a transverse section of the brake taken on the line 2—2 of Figure 1 in the direction of the arrows and showing the cover plate and valving ring in place.

Figure 3 is a circumferential sectional detail of the valving structure taken on the line 3—3 of Figure 1 and showing a portion of the valving ring with the valve passage open for the free flow of the braking fluid.

Figure 4 is a view similar to Figure 3 showing the valving space nearly closed.

Figure 7 is an enlarged sectional detail of the valve means for controlling the flow of oil to the brake and permitting the escape of air therefrom.

Figure 6:
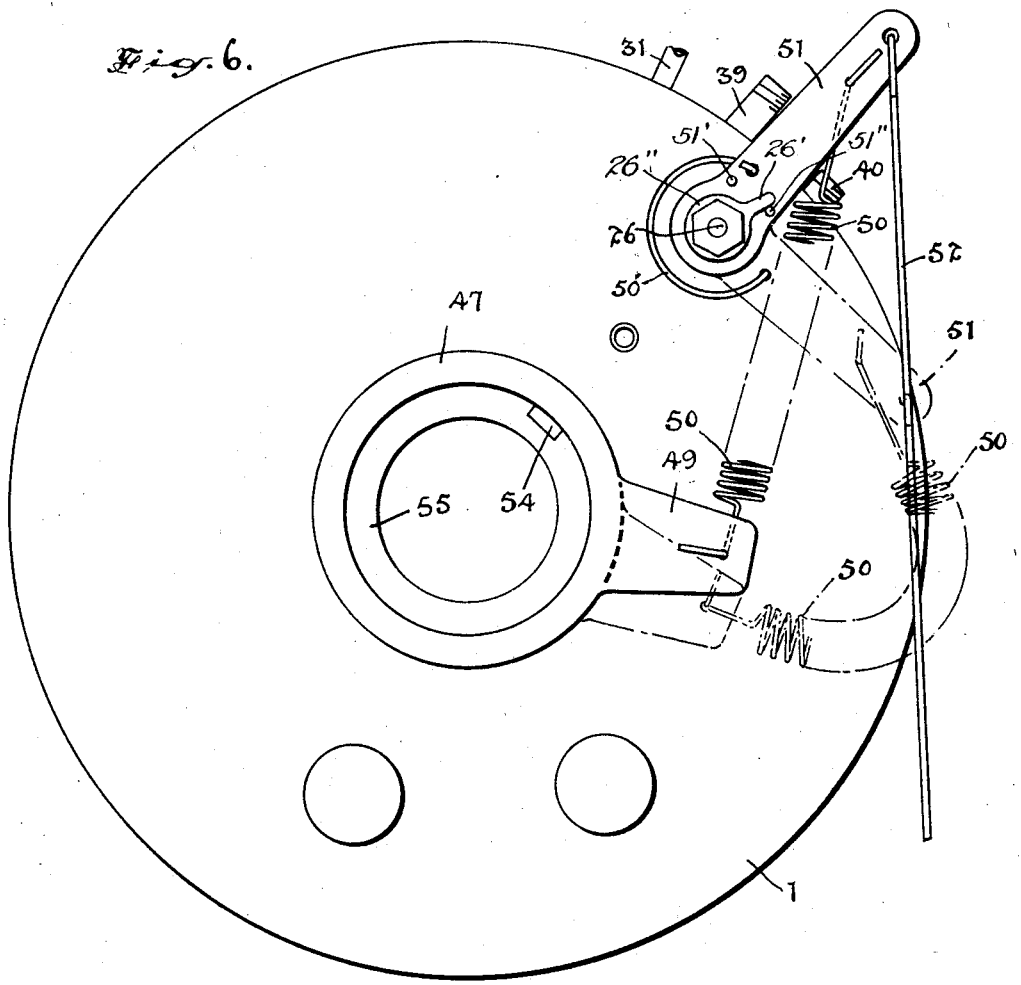
Figure 6 is a plan view of the outer side of the brake housing and the mechanism for controlling the operation of the brake.
Figure 5:
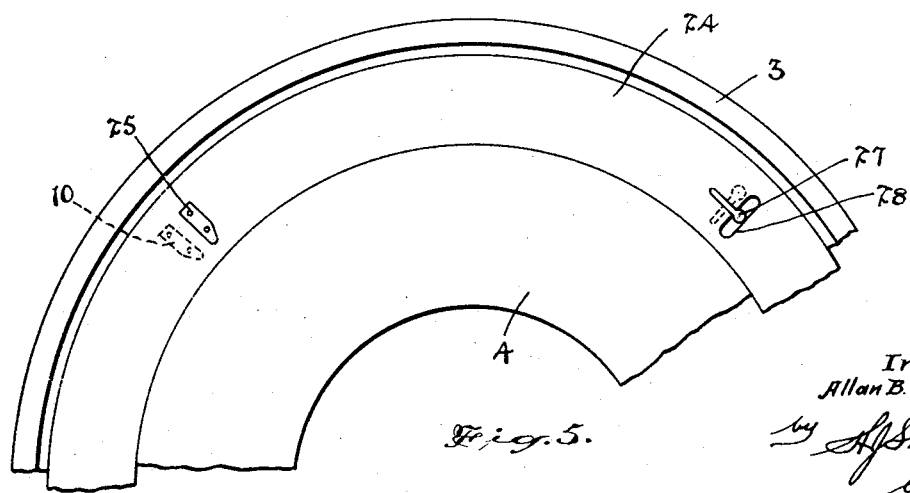
Figure 5 is a plan detail of a portion of the valving ring showing the means of operating same.
Figure 8:
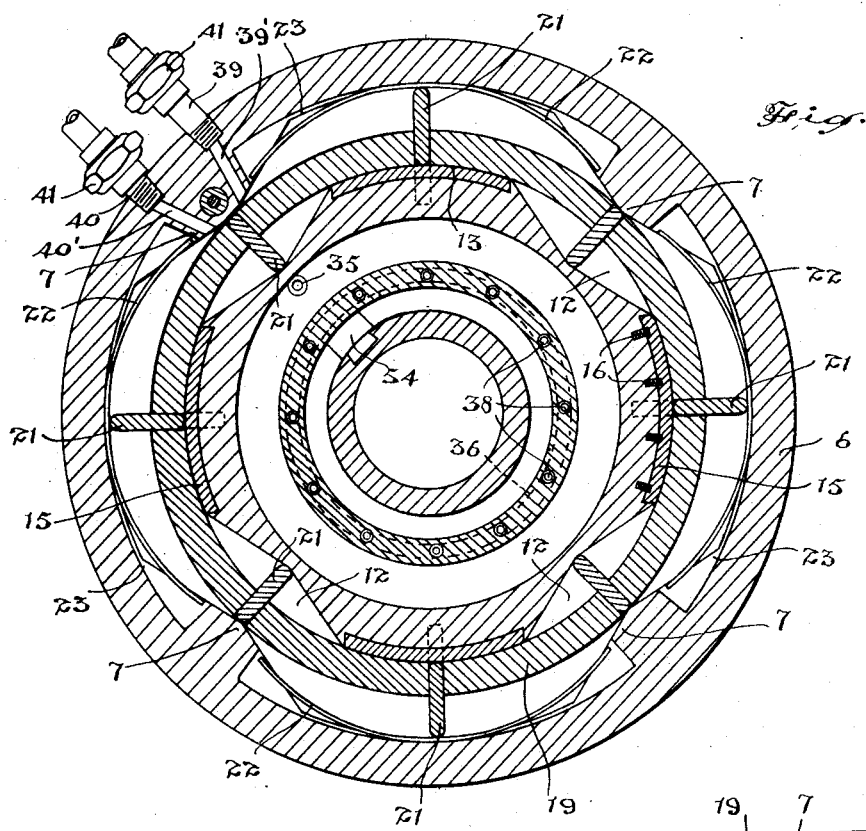
Figure 8 is a mid-sectional view taken on the line 8—8 of Figure 2 on a reduced scale.

Referring to the drawings, the housing 1 which is here shown of cylindrical form is provided with a peripheral recess 2 threaded externally to receive the threaded flange 3 of the face plate 4.

A circular recess or annular chamber 5 is formed in the housing at the inward side of the flange 6 closed by the face plate and at regular intervals around the inner circumference of the flange 6 are arranged a plurality of projections 7 extending inwardly with the walls 8 thereof bevelled to an apex 9. The recess 5 extends over the ends of the projections 7 forming passages designated later herein as 24' and radial blocks 10 are rigidly mounted on the end surfaces of said projections and extend from the inner surface of the flange 6 to the apexes 9.

The wall 11 of the housing is in reality a cam member, being formed with broad V-shaped recesses 12, the surfaces of which are parallel with the bevelled surfaces of the projections 7 and between the recesses 12 the circumferential surfaces 13 of the cam member 11 are concentric with the portions of the inner circumference of the flange 6 between the projections 7, the number of recesses 12 corresponding to the number of projections 7. The surfaces 13 are preferably formed of plates 15 which are spring held outwardly by springs 16.

A rotor member 17 is mounted within the housing having a circular flange 17' abutting the flange 18 of the housing 1 and the laterally flanged portion 19 of said rotor presents a substantial seal continuously with the apexes of the projections 7 so that a plurality of sealed work chambers are formed between the wall 6 and the rotor flange 19 and the bevelled end walls of the projections 7 is formed with a plurality of radial slots 20 in which are slidably mounted the vanes 21. There are double the number of slots and vanes in the rotor as there are the bevelled members 7 and the vanes are held in sliding contact with the inner walls of the outer flange of the housing and the outer recessed and circumferential walls of the cam member 11.

The rotation of the rotor carries the vanes around in the recess between the inner and outer walls of the housing and the vanes slide in and out in the slots to pass over the bevelled obstructions 7.

Bowed springs 22 are housed in recesses 23 formed in the inner wall of the casing and the bevelled faces of the projections 7. The curve of the springs when free span the angle between the faces of the projections and the casing wall and exerting a spring pressure in an inward direction against the outer edges of the vanes to counteract their outward thrust through centrifugal force and assist in moving the vanes radially inward to maintain contact with the cam wall 11 of the central cam member.

The face plate 4 extends over and encloses the rotor and the vanes carried thereby.

It will be readily understood that as the rotor rotates and carries the vanes through the work chambers previously described the fluid within said work chambers will be forced ahead of the vanes and as the said work chambers are connected by passages 24' over the end of the projections 7 the fluid will be forced successively from one recess to the other and the movement of the rotor will be unobstructed.

The radial blocks 10 are arranged across the ends of the projections 7 as shown in Figures 1, 3, 4 and 9 and co-operate with movable blocks now to be described to control the flow of fluid circulated by the action of the vanes. An annular plate 24 rotatably mounted in a recess in the face plate 4 is provided with radial blocks 25 which by the rotation of the plate 24 will be moved toward or from the blocks 10 and the flow of the fluid between the successive work chambers over the ends of the projections 7 will be regulated thereby.

It will be noted that the outer side of the blocks 10 are spaced from the adjacent wall of the annular plate 24 so that a clear passage 24' is thus provided and the forced fluid may pass from one work chamber to the other over the projection or obstructions 7 by way of passage 24'. Thus in reality the passages 24' and the work chambers are connected to form the continuous passage 5 previously referred to.

Accordingly as the annular plate or ring 24 is adjusted the flow of fluid through the various passages 24' will be free or retarded as clearly illustrated in Figures 3 and 4 and as the flow is retarded the vanes will be obstructed by the fluid and a braking effect on the rotor is produced. Grooves 21' extend longitudinally of the side edges of the vanes 21 and permit any fluid trapped in the bottom of the slots 20 to escape on the inward movement of the vanes preventing binding.

Figure 10:
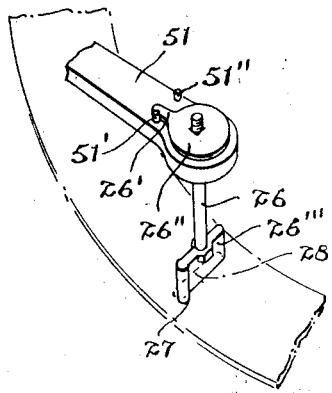
Figure 10 is a detail perspective view illustrating the brake control means with the same in maximum braking position.
Figure 9:
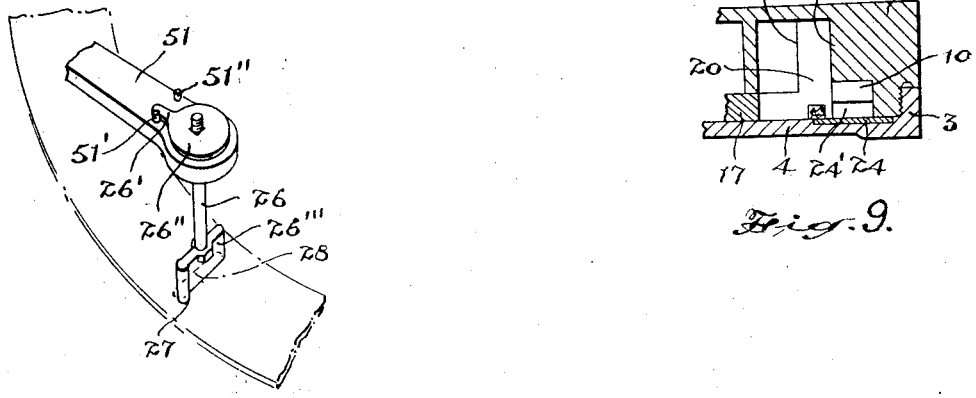
Figure 9 is a fragmentary sectional view taken on the line 9—9 of Figure 1, the vane being removed from the slot.

The operation of the control ring 24 is accomplished by means of a spindle 26 journalled in the housing 1 which is provided with a crank pin 27 at its inner end which engages the walls of a radial slot 28 in the ring 24 and upon the turning of the spindle the crank pin rotates the ring to move the radial blocks 25 toward or from the blocks 10. As shown in Figure 10 the inner end of the control spindle 26 carries a portion 26''' which turns therewith and this vane member carries the crank pin 27. The vane in being turned serves to control the flow of fluid in the particular passage 24' in which it is arranged, as best indicated at the left of Figure 2, Figure 10 showing it turned to its extreme braking position at right angles to the position in which it is shown in Figure 2.

The spindle 26 is provided with a packing 29 to prevent the escape of the pressure fluid and any fluid forced to the packing is conducted to an annular recess 30 in the housing, which communicates through a pipe 31 to a suitable receptacle, not shown, which is open to atmosphere. The joint between the casing and face plate is suitably sealed to prevent the escape of oil, but should any fluid work outwardly from the braking chambers between the flanges 3 and 6 it will be received in the annular recess 30 and return to said receptacle.

Provision is made for the release of any pressure fluid escaping between the face plate and the rotor at the inward ends of the vanes. An annular recess 32 is formed in the outer face of the rotor to pick up escaping fluid and it is conducted by the holes 33 to an annular recess or non-pressure chamber 34 in the housing and this recess is connected to the receptacle referred to by a pipe 35.

It is a well known fact that where mechanical packings and close fitting of parts alone are relied on to prevent loss of fluid from the pressure or braking chambers to the outside of the mechanism, such means is only partially efficient and becomes less and less effective through time so that the efficiency and dependability of the device becomes seriously affected.

It is an important feature of this invention therefore that any oil escaping from the braking or pressure chamber is conserved, it being conducted to the reserve chamber or receptacle above-mentioned which is open to atmosphere and it is then returned to the braking chamber to maintain a constant volume and therefore uniform condition of operation.

Packing rings 36 and 37 are provided in the inner flange 17' of the rotor and these are held in operating contact with the adjacent faces of the housing flange 18 and face plate 4 by coil springs 38.

Pipes 30 and 40 are connected to the braking chamber of the housing respectively at opposite sides of one of the projections 7 by the inwardly extending passages 39' 40' and each of these is provided with a valve 41 as shown in detail in Figure 7 to permit the escape of air from the pressure side and allow the free return of oil to supply any loss. The two pipes and valves are provided to act equally well whichever way the rotor is turning. The outer ends of the pipes 39—40 will preferably extend into the lower end of the above referred to open reserve chamber or receptacle (not shown).

In the valve construction shown, a valve seat 42 connected with the pipe leading from the casing is provided with lateral openings 43 through which oil may flow. The valve 44 has a very minute central opening 45 to allow air to escape from the pressure side when the valve lifts from seat 42 and engages a seat 46 on the outlet side.

The valve checks the outward flow of any appreciable quantity of oil but permits free escape of air. A backward flow of oil flows around the valve and passes through the openings 43. The valve in each of the pipes is the same but they function in accordance with the direction of rotation of the rotor since the pipes are located at opposite sides of one of the obstructing members 7. Thus one on the reverse to the pressure side of the member 7 will admit oil from the receiver or reservoir while the other prevents its escape.

The central flange 18 of the housing is formed with an arrangement of one or more spiral grooves 46 and a sleeve 47 rotatable in the central opening inside the flange is provided with pins 48 engaging said grooves so that upon the rotation of the sleeve the pins will travel in the spiral grooves and move the sleeve in or out. The sleeve is provided with an arm 49 extending outside the housing and this is connected by a spring 50 to a lever 51 which is here shown mounted on the outer end of the spindle 26 for operating the valving ring, the lever being rotatable within certain limits on the spindle as hereinafter described. A spring 50' is provided for returning the lever 51 to its normal position.

A rod 52 is connected to the lever 51 and is operated in any suitable manner.

The rotor 17 is provided with a plurality of notches 53 and a key member 54, connected to the sleeve 47 by a lug 54' extending into an annular groove therein, is adapted to enter any one of said notches by the inward movement of the sleeve.

A hub member 55 which is connected to the rotating element to be braked is provided with a keyway 56 in which the key slides.

The hub rotates freely without operating the rotor 17 until the key is moved to engage one of the notches 53 by the operation of the sleeve 47 by the lever 51 due to the intervening spring connection 50 and when the key engages the rotor it rotates and circulates the braking fluid in the manner described. A further movement of the lever 51 brings the pins 51' into engagement with the projection 26' of a disc 26'' which is non-rotatably secured in any suitable manner to the spindle 26 so that the spindle 26 is turned to shift the valving ring 24 which chokes the flow of the fluid and immediately resists the rotation of the hub member. This resistance can be regulated by the manipulation of the lever 51 from a free movement to the almost complete arresting of the hub suitable means, such as a pair of stud projections as indicated by the small circles at the lower part of Figure 6, may be provided to engage an adjacent structure to anchor the housing 1 against rotation. As will be seen from reference to Figure 6 the connecting spring 50 forms a positive operating connection between the members 51 and 49 presenting sufficient resistance to compression to readily move the member 47 into clutching position during the initial movement of the member 51 but upon further movement of the lever 51 after the clutch 47 has been fully engaged by movement its maximum distance, the spring 50 will simply be displaced laterally permitting a free latitude of control movement for the lever 51 while the clutch remains in clutching position.

The return movement of the spindle 26 is effected through the engagement of a second pin projection 51'' carried thereby, with the lug 26'.

The braking effect is through a fluid medium such as oil and it will be readily understood that all the parts are thoroughly lubricated at all times. The resistance is entirely taken up by the oil and not by a clamping force of any kind, consequently the severest application does not create any direct wearing effect such as is found in a band or shoe brake. All the parts requiring adjustment may be provided with self-adjusting surfaces which will require no attention for long periods of use.

What I claim as my invention is:—

1. In a fluid brake, the combination with a stationary casing adapted to contain a fluid, a rotor therein having a plurality of vanes extending radially therefrom, and a plurality of cam obstructions successively cooperating with said vanes to reciprocate same, of means including a rotatable valving ring co-operating with said cam obstructions for variably controlling the flow of fluid past said cam obstructions to variably resist the rotation of said rotor.

2. In a fluid brake, the combination with a cylindrical casing adapted to contain a fluid medium, a rotor enclosed within the casing, a plurality of vanes extending radially from said rotor, a plurality of cam obstructions co-operating successively with said vanes in their travel to effect a positive radial movement thereof in each direction and maintain positive sealing contact therewith, of rotatable valving means mounted within said casing and operating circumferentially of said casing for permitting a regulated flow of fluid past certain of said cam obstructions in accordance with the braking effort required.

3. In a fluid brake, the combination with a fixed casing adapted to contain a fluid, a rotor mounted within said casing, radially arranged vanes extending from said rotor, and obstructing means arranged within the path of said vanes for moving them radially inwardly and outwardly, said obstructing means having a passage extending therepast forming a common conduit of an annular valving member rotatably arranged in said passage concentrically of said rotor adapted to control the flow of fluid to regulate its resistance in passing said obstruction.

4. A fluid brake, comprising a casing having an annular chamber therein, bevelled obstruction members extending inwardly from the outer wall of said chamber, the inner wall of said chamber being spaced uniformly from the outer wall and having depressions corresponding with the obstructions, a rotor mounted in said casing having a flange extending into said annular chamber, a plurality of vanes radially mounted in said rotor and having the inward and outward edges engaging the inner and outward walls respectively of said chamber, a fluid passage extending over one side of said obstructions, a radial projection on each of said obstructions extending into said fluid passage, and a plurality of radial members circumferentially adjustable adapted to be moved toward or from the radial obstruction members to regulate the flow of an obstructing fluid.

5. A fluid brake, comprising a cylindrical casing having a plurality of inwardly tapered projections uniformly spaced extending inwardly from its inner periphery, a rotor arranged within said casing having its outer peripheral wall arranged adjacent to the apexes of said projecting members, a plurality of radial slots in said rotor equally spaced therearound and of double the number of said inward projections, a central cam member engaging the inner edges of said vanes to hold them with their outward edges in contact with the inward peripheral wall of said chamber and the inwardly projecting obstruction members, said casing being adapted to contain an obstructing fluid to resist the circumferential movement of said vanes and said rotor, and valving means for controlling the flow of the fluid past said obstructions.

6. A fluid brake, comprising a cylindrical casing having a plurality of inwardly tapered projections uniformly spaced extending inwardly from its inner periphery, a rotor arranged within said casing having its outer peripheral wall arranged adjacent to the apexes of said projecting members, a plurality of radial slots in said rotor equally spaced therearound and of double the number of said inward projections, a central cam member engaging the inner edges of said vanes to hold them with their outward edges in contact with the inward peripheral wall of said chamber and the inwardly projecting obstruction members, said casing being adapted to contain an obstructing fluid to resist the circumferential movement of said vanes and said rotor, said bevelled obstructions having a passage thereover at one side thereof, radial ribs extending into said passage from said obstruction members, a ring rotatably mounted in the casing and having radially arranged ribs adapted to co-operate with the aforesaid ribs to regulate the flow of braking fluid, and means for adjusting said ring to move the ribs thereof in relation to the fixed ribs.

7. A fluid brake, comprising a cylindrical casing having a plurality of inwardly tapered projections uniformly spaced extending inwardly from its inner periphery, a rotor arranged within said casing having its outer peripheral wall arranged adjacent to the apexes of said projecting members, a plurality of radial slots in said rotor equally spaced therearound and of double the number of said inward projections, a central cam member engaging the inner edges of said vanes to hold them with their outward edges in contact with the inward peripheral wall of said chamber and the inwardly projecting obstruction members, said casing being adapted to contain an obstructing fluid to resist the circumferential movement of said vanes and said rotor, said bevelled obstructions having a passage thereover at one side thereof, radial ribs extending into said passage from said obstruction members, a ring rotatably mounted in the casing and having radially arranged ribs adapted to co-operate with the aforesaid ribs to regulate the flow of braking fluid, said ring having a radially arranged slot therein, a crank member mounted in the casing engaging said radial slot and adapted to rotate the ring, and means for operating said crank member.

8. A fluid brake, comprising a cylindrical casing having a plurality of inwardly tapered projections uniformly spaced extending inwardly from its inner periphery, a rotor arranged within said casing having its outer peripheral wall arranged adjacent to the apexes of said projecting members, a plurality of radial slots in said rotor equally spaced therearound and of double the number of said inward projections, a central cam member engaging the inner edges of said vanes to hold them with their outward edges in contact with the inward peripheral wall of said chamber and the inwardly projecting obstruction members, said casing being adapted to contain an obstructing fluid to resist the circumferential movement of said vanes and said rotor, said bevelled obstructions having a passage thereover at one side thereof, radial ribs extending into said passage from said obstruction members, a ring rotatably mounted in the casing and having radially arranged ribs adapted to co-operate with the aforesaid ribs to regulate the flow of braking fluid, said ring having a radially arranged slot therein, a spindle mounted in the casing having a crank and engaging said radial slot and adapted to rotate the ring, a lever secured to said spindle, and an operating rod connected with said lever.

9. In a fluid brake, the combination of a stator and rotor having a plurality of cam obstructions therebetween forming a plurality of spaced braking chambers, said chambers being adapted to be filled with a braking fluid, reciprocal braking vanes for displacing said fluid in said braking chambers, means for controlling said fluid displacement, means forming a low pressure chamber receiving any leakage of fluid escaping from said braking chambers, and means for collecting and returning said leakage fluid to said braking chambers.

10. In a fluid brake, the combination of a stator and rotor having a plurality of cam obstructions therebetween forming a plurality of spaced braking chambers, said chambers being adapted to be filled with a braking fluid, reciprocal braking vanes for displacing said fluid in said braking chambers, means for controlling said fluid displacement, a reserve supply chamber or receptacle containing a supply of braking fluid, pipes leading respectively from opposite sides of said cam obstructions connected with the adjacent ends of the respective braking chambers and extending into said reserve supply chamber, control means associated with said pipes for controlling the flow of fluid therethrough, and means for collecting any leakage of fluid escaping from said braking chambers and conducting same to said reserve supply chamber.

11. In a fluid brake, the combination of a stator and rotor having a plurality of cam obstructions therebetween forming a plurality of spaced braking chambers, said chambers being adapted to be filled with a braking fluid, reciprocal braking vanes for displacing said fluid in said braking chambers, means for controlling said fluid displacement, a reserve supply chamber or receptacle having its interior open to atmosphere and adapted to contain a supply of braking fluid, conducting pipes leading respectively one from each side of said cam obstructions to connect with the adjacent high and low pressure ends of the respective working chambers, said pipes leading into said reserve supply chamber, a valve arranged in each of said pipes, one permitting a free return flow of fluid from said reserve chamber to the low pressure end of said braking chambers while the valve in the other pipe resists the outward flow of fluid from the high pressure end of said chambers, said valve having means for permitting the escape of air from the high pressure end of said working chambers past said latter valve into said open reserve chamber, and means for collecting any fluid leakage escaping from said braking chambers and returning same to said reserve chamber.

12. A fluid brake as claimed in claim 11 in which said valves each seat in opposite directions and are actuated selectively in accordance with the direction of rotation of the brake rotor, said means for permitting escape of air comprising a minute by-pass for permitting the passage of trapped air when the valve is closed to the passage of the braking fluid.

13. In a fluid brake, the combination of a stator and rotor having a plurality of cam obstructions therebetween forming a plurality of spaced braking chambers, said chambers being adapted to be filled with a braking fluid, reciprocable braking vanes moving from one of said braking chambers to the other to displace the fluid therein, said vanes being adapted to contact said cam obstructions, and arc-shaped spring elements co-operating with said vanes and cam obstructions for resiliently contacting the ends of said vanes.

14. A fluid brake as claimed in claim 13 in which said vanes are radially reciprocable in the rotor and in being carried around thereby are subject to centrifugal force, the outer ends of said vanes being engaged by the arc-shaped springs as they approach and recede from said cam obstructions, whereby said vanes are cushioned against centrifugal action and are resiliently urged inwardly.

15. In a fluid brake, the combination of a stator and rotor having a plurality of cam obstructions therebetween forming a plurality of spaced braking chambers, said chambers being adapted to be filled with a braking fluid, reciprocable braking vanes moving from one of said braking chambers to the other to displace the fluid therein, said vanes being adapted to contact said cam obstructions, said stator presenting outer concentric wall portions between said cam obstructions against which the vanes are adapted to bear in sealing contact at their outer ends and also having cam obstructions presenting inner concentric wall portions disposed in concentric spaced relation to the aforesaid outer concentric wall portions, said inner concentric wall portions comprising movable plate members presenting outward concentric surfaces for sealing engagement with the inner ends of said vanes, and means for resiliently urging said movable plates into close sealing contact with said inner vane ends to maintain a positive sealing engagement and to compensate for wear.

16. In a fluid brake, the combination with a stationary casing adapted to contain a fluid, a rotor therein having a plurality of vanes extending radially therefrom, and a plurality of cam obstructions successively co-operating with said vanes to reciprocate same, of a valving ring member rotatably mounted in said casing, and valve members connected with said valving ring and moved bodily by the rotation of said ring to control the flow of fluid past said cam obstructions.

17. In a fluid brake, the combination with a stationary casing adapted to contain a fluid, a rotor therein having a plurality of vanes extending radially therefrom, and a plurality of cam obstructions successively co-operating with said vanes to reciprocate same, of a plurality of fixed valve elements associated with said cam obstructions, a plurality of movable valve elements co-operatively related to said fixed valve elements and movable relative thereto to control the flow of fluid past said cam obstructions, and a control ring member rotatably fitted in the periphery of said casing for peripheral adjustment, said movable valve elements being operatively connected with said peripherally adjustable ring member and actuated thereby.

ALLAN B. SHANTZ.